(12) United States Patent
Fenton et al.

(10) Patent No.: US 9,026,708 B1
(45) Date of Patent: May 5, 2015

(54) FIELD SERVICEABLE IT SYSTEM

(75) Inventors: Joseph E. Fenton, Uxbridge, MA (US); Adrianus Djohan, South Grafton, MA (US); Jason A. Harland, Boston, MA (US)

(73) Assignee: EMC Corporation, Hopkinton, MA (US)

( * ) Notice: Subject to any disclaimer, the term of this patent is extended or adjusted under 35 U.S.C. 154(b) by 469 days.

(21) Appl. No.: 13/436,885

(22) Filed: Mar. 31, 2012

(51) Int. Cl.
*H05K 7/10* (2006.01)
*G06F 1/16* (2006.01)

(52) U.S. Cl.
CPC .................................. *G06F 1/16* (2013.01)

(58) Field of Classification Search
CPC .......................................................... G06F 1/20
See application file for complete search history.

(56) References Cited

U.S. PATENT DOCUMENTS

| | | | |
|---|---|---|---|
| 2007/0230109 A1* | 10/2007 | Starr et al. | 361/685 |
| 2009/0231800 A1* | 9/2009 | Franz et al. | 361/679.37 |
| 2011/0007467 A1* | 1/2011 | Bottom et al. | 361/679.02 |

* cited by examiner

*Primary Examiner* — Henry Tsai
*Assistant Examiner* — Juanito Borromeo
(74) *Attorney, Agent, or Firm* — Brian J. Colandreo; Mark H. Whittenberger; Holland & Knight LLP

(57) ABSTRACT

A field serviceable IT system includes an IT enclosure. A first connector assembly is positioned within the IT enclosure. At least one I/O module is releasably coupled to the first connector assembly and positioned within the IT enclosure. A disk subsystem is releasably coupled to the at least one I/O module and positioned within the IT enclosure. At least one disk drive assembly is releasably coupled to the disk subsystem and positioned within the IT enclosure. A system board is releasably coupled to the first connector assembly and positioned within the IT enclosure. The system board is configured to be removable from the IT enclosure without first removing the at least one I/O module or the at least one disk drive assembly from the IT enclosure.

19 Claims, 2 Drawing Sheets

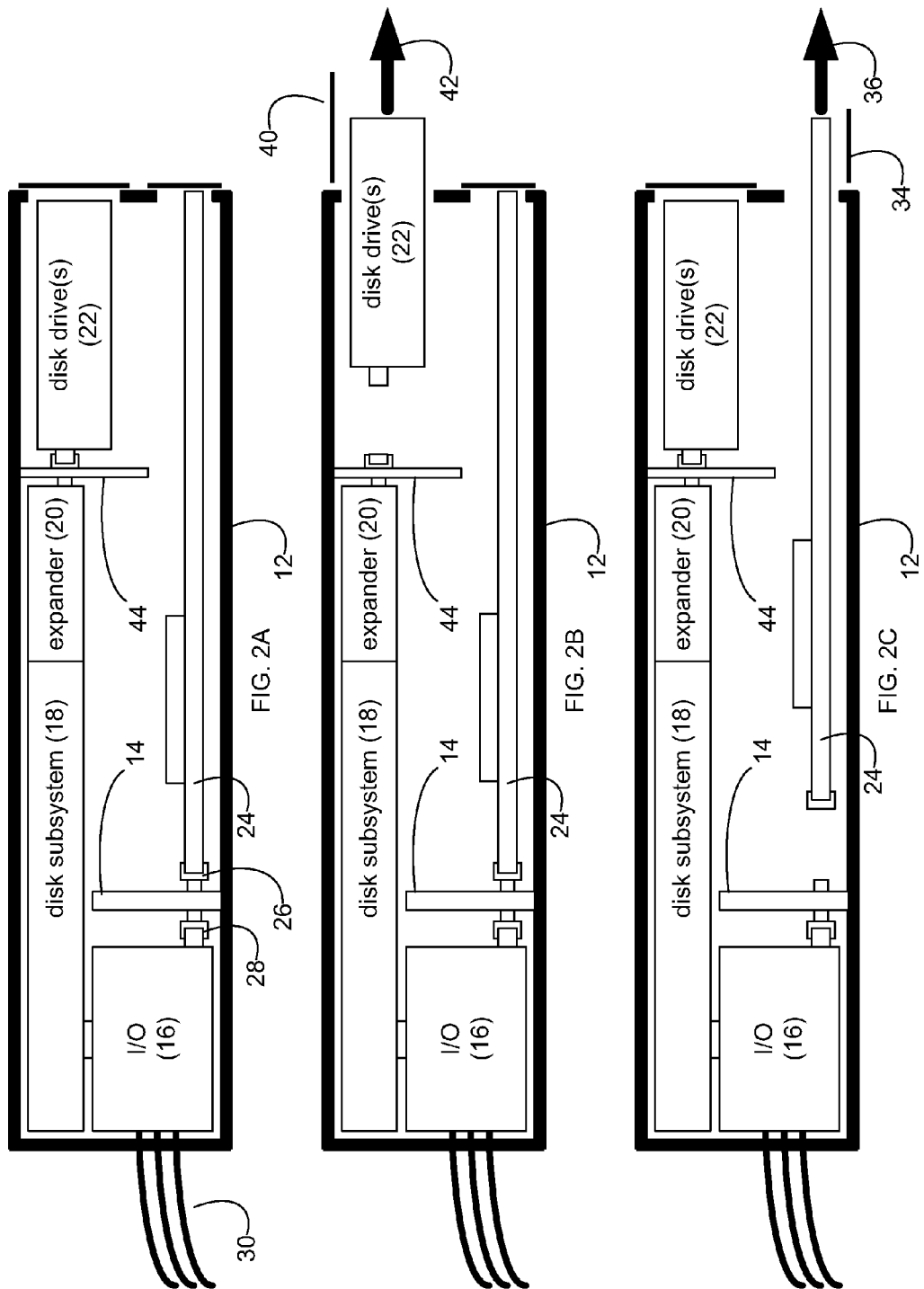

FIELD SERVICEABLE IT SYSTEM

TECHNICAL FIELD

This disclosure relates to IT components and, more particularly, to field-serviceable IT components.

BACKGROUND

In today's IT infrastructure, high availability is of paramount importance. Specifically, critical (and sometimes non-critical) components within an IT infrastructure are often layered in redundancy. For example, primary servers may be supported by backup servers; primary switches may be supported by backup switches; primary power supplies may be supported by backup power supplies; and primary storage systems may be supported by backup storage systems.

Oftentimes, various IT components need to be serviced in the field and, naturally, the quicker these devices can be serviced, the less downtime for the device. Unfortunately, some IT components are designed in a manner that makes servicing them in the field difficult. For example, sometimes in order to remove a serviceable component (e.g., a system board) from an IT component, many other subsystems need to be removed just to access the serviceable component and enable its removal.

SUMMARY OF DISCLOSURE

In a first implementation, a field serviceable IT system includes an IT enclosure. A first connector assembly is positioned within the IT enclosure. At least one I/O module is releasably coupled to the first connector assembly and positioned within the IT enclosure. A disk subsystem is releasably coupled to the at least one I/O module and positioned within the IT enclosure. At least one disk drive assembly is releasably coupled to the disk subsystem and positioned within the IT enclosure. A system board is releasably coupled to the first connector assembly and positioned within the IT enclosure. The system board is configured to be removable from the IT enclosure without first removing the at least one I/O module or the at least one disk drive assembly from the IT enclosure.

One or more of the following features may be included. The IT enclosure may be a rack mount IT enclosure. The IT enclosure may include a first service port configured to allow access to the system board. The at least one disk drive assembly may be configured to be removable from the IT enclosure without first removing the at least one I/O module or the system board from the IT enclosure. The IT enclosure may include a second service port configured to allow access to the at least one disk drive assembly.

The disk subsystem may include an SAS disk subsystem. The SAS disk subsystem may include an SAS drive expander. The at least one disk drive assembly may be an SAS disk drive assembly. The at least one I/O module may be configured to couple the field serviceable IT system to one or more external IT systems. A second connector assembly may releasably couple the at least one disk drive assembly to the disk subsystem.

In another implementation, a field serviceable IT system includes a first connector assembly positionable within an IT enclosure. At least one I/O module is releasably coupled to the first connector assembly and positionable within the IT enclosure. A disk subsystem is releasably coupled to the at least one I/O module and positionable within the IT enclosure. At least one disk drive assembly is releasably coupled to the disk subsystem and positionable within the IT enclosure. A system board is releasably coupled to the first connector assembly and positionable within the IT enclosure. The system board is configured to be removable from the IT enclosure without first removing the at least one I/O module or the at least one disk drive assembly from the IT enclosure.

One or more of the following features may be included. The at least one disk drive assembly may be configured to be removable from the IT enclosure without first removing the at least one I/O module or the system board from the IT enclosure. The disk subsystem may include an SAS disk subsystem. The SAS disk subsystem may include an SAS drive expander. The at least one disk drive assembly may be an SAS disk drive assembly. The at least one I/O module may be configured to couple the field serviceable IT system to one or more external IT systems. A second connector assembly may releasably couple the at least one disk drive assembly to the disk subsystem.

In another implementation, a field serviceable IT system includes an IT enclosure. A first connector assembly is positioned within the IT enclosure. At least one I/O module is releasably coupled to the first connector assembly and positioned within the IT enclosure. A disk subsystem is releasably coupled to the at least one I/O module and positioned within the IT enclosure. At least one disk drive assembly is releasably coupled to the disk subsystem and positioned within the IT enclosure. A system board is releasably coupled to the first connector assembly and positioned within the IT enclosure. The system board is configured to be removable from the IT enclosure without first removing the at least one I/O module or the at least one disk drive assembly from the IT enclosure. The at least one disk drive assembly is configured to be removable from the IT enclosure without first removing the at least one I/O module or the system board from the IT enclosure.

One or more of the following features may be included. The IT enclosure may be a rack mount IT enclosure. The IT enclosure may include a first service port configured to allow access to the system board. The IT enclosure may include a second service port configured to allow access to the at least one disk drive assembly.

The details of one or more implementations are set forth in the accompanying drawings and the description below. Other features and advantages will become apparent from the description, the drawings, and the claims.

BRIEF DESCRIPTION OF THE DRAWINGS

FIGS. 2A-2C are diagrammatic views of the field serviceable IT system of FIG. 1.

Like reference symbols in the various drawings indicate like elements.

DETAILED DESCRIPTION OF THE PREFERRED EMBODIMENTS

Figure 1:
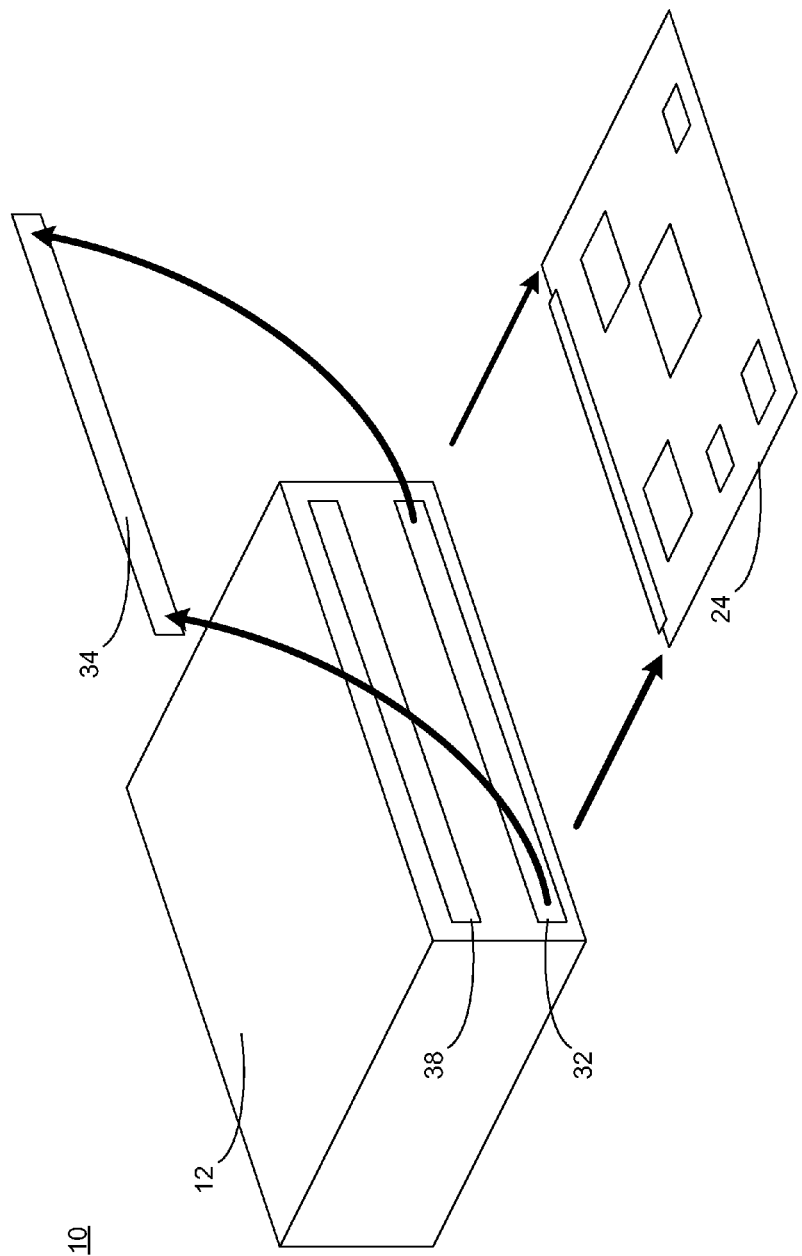
FIG. 1 is an isometric view of a field serviceable IT system.

Referring to FIGS. 1 & 2A-2C, there is shown field serviceable IT system 10. Field serviceable IT system 10 may include IT enclosure 12. IT enclosure 12 may be any enclosure configured to house IT equipment. IT enclosure 12 may include a power supply (not shown) for converting external AC voltage to a DC voltage capable of powering the IT equipment included within IT enclosure 12. One particular example of IT enclosure 12 may include but is not limited to a rack mount IT enclosure. As is known in the art, IT enclosures may be configured to be mounted to one or more NEMA rails included within IT equipment racks.

First connector assembly 14 may be positioned within IT enclosure 12. Examples of first connector assembly 14 may include but are not limited to a passive midplane (i.e. a midplane that does not perform any data processing and typically only couples external devices) or an active midplane (i.e. a midplane that performs some data processing). Connector assembly 14 may include one or more electrical connector assemblies that enable connector assembly 14 to be electrically coupled with other devices/systems. Examples of first connector assembly 14 may include but are not limited to a midplane assembly or a plurality of cables/conductors.

One or more I/O modules (e.g. I/O module 16) may be releasably coupled to connector assembly 14 and positioned within IT enclosure 12. I/O module 16 may be configured to couple field serviceable IT system 10 to one or more external IT systems. For example, I/O module 16 may include an ethernet module that is configured to couple field serviceable IT system 10 to an ethernet network (not shown). Further, I/O module 16 may include a fiber channel module that is configured to couple field serviceable IT system 10 to a fiber channel network (not shown). Further still, I/O module 16 may include a SCSI adapter configured to couple field serviceable IT system 10 to one or more external SCSI devices (not shown).

Disk subsystem 18 may be releasably coupled to I/O module 16 and may be positioned within IT enclosure 12. Examples of disk subsystem 18 may include but are not limited to an SAS disk subsystem, a fibre channel disk subsystem, or a PCIe disk subsystem. If disk subsystem 18 is an SAS disk subsystem, disk subsystem 18 may further include SAS drive expander 20. If disk subsystem 18 is a PCIe disk subsystem, disk subsystem 18 may further include a switch (as opposed to an SAS drive expander). As is known in the art, an SAS system is a system of Serially Attached SCSI devices that are coupled to each other in a manner that is different from traditional SCSI devices. For example, SAS devices may be coupled in a manner similar to network devices and through a switch type assembly (e.g. SAS drive expander 20).

One or more disk drive assemblies (e.g. disk drive assembly 22) may be releasably coupled to disk subsystem 18 and positioned within IT enclosure 12. If disk subsystem 18 is an SAS disk subsystem, disk drive assembly 22 may be an SAS disk drive assembly. While the system is shown to include one disk drive assembly (namely disk drive assembly 22), this is for illustrative purposes only and is not intended to be a limitation of this disclosure. For example and through the use of the appropriate technology (e.g. SAS drive expander 20 or a PCIe switch), a plurality of disk drive assemblies may be coupled to disk subsystem 18.

Field serviceable IT system 10 may include system board 24. System board 24 may be releasably coupled to first midplane 16 and may be positioned within IT enclosure 12. As discussed above, connector assembly 14 may include one or more electrical connector assemblies that enable connector assembly 14 to be electrically coupled with other devices/systems. Accordingly, a first electrical connector assembly (e.g. electrical connector assembly 26) may be configured to releasably couple first midplane 14 to system board 24. Further, a second electrical connector assembly (e.g. electrical connector assembly 28) may be configured to releasably couple first midplane 14 to I/O module 16.

System board 24 may be configured to be removable from IT enclosure 12 without first needing to remove I/O module 16 or disk drive assembly 22 from IT enclosure 12. As stated above, IT infrastructure is typically heavily depended upon, wherein downtime due to maintenance and repairs should be minimized. Accordingly, by configuring system board 24 so that it could be removed from IT enclosure 12 without having to remove I/O module 16 and disconnect all of the cabling (e.g., cabling 30) that couples field serviceable IT system 10 to external IT systems, the efficiency of the maintenance/repair would be increased and downtime would be reduced. IT enclosure 12 may include first service port 32 configured to allow access to system board 24. For example, first service port 32 may be covered by removable panel 34 that may be removed so that system board 24 may be decoupled from first midplane 14 (via electrical connector assembly 26) and removed from IT enclosure 12 through first service port 32 in the direction of arrow 36.

Additionally, disk drive assembly 22 may be configured to be removable from IT enclosure 12 without first needing to remove I/O module 16 or system board 24 from IT enclosure 12. IT enclosure 12 may include second service port 38 configured to allow access to disk drive assembly 22. For example, second service port 38 may be covered by removable panel 40 that may be removed so that disk drive assembly 22 may be decoupled from disk subsystem 18 and removed from IT enclosure 12 through second service port 38 in the direction of arrow 42. Second connector assembly 44 may be configured to releasably couple disk drive assembly 22 to disk subsystem 18. Examples of second connector assembly 44 may include but are not limited to a midplane assembly or a plurality of cables/conductors.

While the system is described above as allowing the removal of system board 24 and/or disk drive assembly 22 without needing to remove I/O module 16, the converse may also be true. If IT enclosure 12 is configured so that there is a service port on the back of IT enclosure 12, I/O module 16 may be removeable without needing to remove system board 24 or disk drive assembly 22.

Having thus described the disclosure of the present application in detail and by reference to embodiments thereof, it will be apparent that modifications and variations are possible without departing from the scope of the disclosure defined in the appended claims.

What is claimed is:

1. A field serviceable IT system comprising:
    an IT enclosure;
    a first connector assembly positioned within the IT enclosure;
    at least one I/O module releasably coupled to the first connector assembly and positioned within the IT enclosure;
    a disk subsystem releasably coupled to the at least one I/O module and positioned within the IT enclosure;
    at least one disk drive assembly releasably coupled to the disk subsystem and positioned within the IT enclosure; and
    a system board releasably coupled to the first connector assembly and positioned within the IT enclosure, wherein the system board is configured to be removable from the IT enclosure without first removing the at least one I/O module and the at least one disk drive assembly from the IT enclosure;
    wherein the IT enclosure includes a first service port configured to allow removal of the system board.

2. The field serviceable IT system of claim 1 wherein the IT enclosure is a rack mount IT enclosure.

3. The field serviceable IT system of claim 1 wherein the at least one disk drive assembly is configured to be removable from the IT enclosure without first removing the at least one I/O module or the system board from the IT enclosure.

4. The field serviceable IT system of claim 3 wherein the IT enclosure include a second service port configured to allow access to the at least one disk drive assembly.

5. The field serviceable IT system of claim 1 wherein the disk subsystem includes an SAS disk subsystem.

6. The field serviceable IT system of claim 5 wherein the SAS disk subsystem includes an SAS drive expander.

7. The field serviceable IT system of claim 5 wherein the at least one disk drive assembly is an SAS disk drive assembly.

8. The field serviceable IT system of claim 1 wherein the at least one I/O module is configured to couple the field serviceable IT system to one or more external IT systems.

9. The field serviceable IT system of claim 1 further comprising:
 a second connector assembly for releasably coupling the at least one disk drive assembly to the disk subsystem.

10. A field serviceable IT system comprising:
 a first connector assembly positionable within an IT enclosure;
 at least one I/O module releasably coupled to the first connector assembly and positionable within the IT enclosure;
 a disk subsystem releasably coupled to the at least one I/O module and positionable within the IT enclosure;
 at least one disk drive assembly releasably coupled to the disk subsystem and positionable within the IT enclosure; and
 a system board releasably coupled to the first connector assembly and positionable within the IT enclosure, wherein the system board is configured to be removable from the IT enclosure without first removing the at least one I/O module and the at least one disk drive assembly from the IT enclosure;
 wherein the IT enclosure includes a first service port configured to allow removal of the system board.

11. The field serviceable IT system of claim 10 wherein the at least one disk drive assembly is configured to be removable from the IT enclosure without first removing the at least one I/O module or the system board from the IT enclosure.

12. The field serviceable IT system of claim 10 wherein the disk subsystem includes an SAS disk subsystem.

13. The field serviceable IT system of claim 12 wherein the SAS disk subsystem includes an SAS drive expander.

14. The field serviceable IT system of claim 12 wherein the at least one disk drive assembly is an SAS disk drive assembly.

15. The field serviceable IT system of claim 10 wherein the at least one I/O module is configured to couple the field serviceable IT system to one or more external IT systems.

16. The field serviceable IT system of claim 10 further comprising:
 a second connector assembly for releasably coupling the at least one disk drive assembly to the disk subsystem.

17. A field serviceable IT system comprising:
 an IT enclosure;
 a first connector assembly positioned within the IT enclosure;
 at least one I/O module releasably coupled to the first connector assembly and positioned within the IT enclosure;
 a disk subsystem releasably coupled to the at least one I/O module and positioned within the IT enclosure;
 at least one disk drive assembly releasably coupled to the disk subsystem and positioned within the IT enclosure; and
 a system board releasably coupled to the first connector assembly and positioned within the IT enclosure, wherein the system board is configured to be removable from the IT enclosure without first removing the at least one I/O module and the at least one disk drive assembly from the IT enclosure;
 wherein the at least one disk drive assembly is configured to be removable from the IT enclosure without first removing the at least one I/O module and the system board from the IT enclosure;
 wherein the IT enclosure includes a first service port configured to allow removal of the system board.

18. The field serviceable IT system of claim 17 wherein the IT enclosure is a rack mount IT enclosure.

19. The field serviceable IT system of claim 17 wherein the IT enclosure include a second service port configured to allow access to the at least one disk drive assembly.

* * * * *